(12) United States Patent
Nedergaard Clausen et al.

(10) Patent No.: US 9,005,827 B2
(45) Date of Patent: Apr. 14, 2015

(54) PROCESS FOR OPERATING A HIGH TEMPERATURE FUEL CELL STACK

(75) Inventors: Thomas Nedergaard Clausen, Copenhagen Ø (DK); Thomas Rostrup-Nielsen, Holte (DK); Rasmus Gottrup Barfod, Roskilde (DK); Peter Vang Hendriksen, Hillerød (DK); Johan Hjelm, Malmö (SE); Joachim Jacobsen, Birkerød (DK); John Bøgild Hansen, Copenhagen Ø (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 13/695,944

(22) PCT Filed: May 5, 2010

(86) PCT No.: PCT/EP2010/002765
§ 371 (c)(1),
(2), (4) Date: Nov. 5, 2012

(87) PCT Pub. No.: WO2011/137916
PCT Pub. Date: Nov. 10, 2011

(65) Prior Publication Data
US 2013/0052548 A1   Feb. 28, 2013

(51) Int. Cl.
*H01M 8/06*      (2006.01)
*H01M 8/04*      (2006.01)
*H01M 8/12*      (2006.01)
*H01M 8/14*      (2006.01)

(52) U.S. Cl.
CPC ...... *H01M 8/04955* (2013.01); *H01M 8/04238* (2013.01); *H01M 8/04731* (2013.01); *H01M 8/04873* (2013.01); *H01M 8/0488* (2013.01); *H01M 8/04888* (2013.01); *H01M 8/04007* (2013.01); *H01M 8/04097* (2013.01); *H01M 8/0612* (2013.01); *H01M 2008/1293* (2013.01); *H01M 2008/147* (2013.01); *Y02E 60/50* (2013.01); *Y02E 60/525* (2013.01); *Y02E 60/526* (2013.01)

(58) Field of Classification Search
None
See application file for complete search history.

(56) References Cited

U.S. PATENT DOCUMENTS 7,432,002 B2 * 10/2008 Kumar et al. .................. 429/428
2004/0126632 A1 * 7/2004 Pearson et al. ................. 429/17

(Continued)

FOREIGN PATENT DOCUMENTS

| EP | 2 112 708 A2 | 10/2009 |
|---|---|---|
| JP | 07-006778 | 1/1995 |
| JP | 7-6778 A | 1/1995 |
| JP | 2005-519443 A | 6/2005 |
| JP | 2009-059667 | 3/2009 |

(Continued)

*Primary Examiner* — Patrick Ryan
*Assistant Examiner* — Jose Colucci Rios
(74) *Attorney, Agent, or Firm* — Dickstein Shapiro LLP (57) ABSTRACT

Process for operating a high temperature fuel cell stack by the steps of: connecting the fuel cell stack in parallel to a power supply unit at a predefined temperature and/or voltage of the fuel cell stack, applying a voltage from the power supply unit of between 700 to 1500 mV per fuel cell across the fuel cell stack irrespective of the electro-motive force of the fuel cell stack, heating up the fuel cell stack from the predefined temperature to operation temperature while maintaining the voltage per fuel cell the power supply unit, maintaining the fuel cell stack at or above a predetermined operation temperature and/or above a predetermined voltage until the fuel cell stack is to be put into operation, supplying fuel to the fuel cell stack, and disconnecting the power supply unit followed by connecting a power-requiring load to the fuel cell stack.

15 Claims, 7 Drawing Sheets

(56) References Cited

U.S. PATENT DOCUMENTS

| | | | |
|---|---|---|---|
| 2004/0224193 A1* | 11/2004 | Mitlitsky et al. | 429/13 |
| 2005/0095469 A1* | 5/2005 | Bednarz et al. | 429/13 |
| 2006/0194082 A1* | 8/2006 | Tucker et al. | 429/9 |
| 2006/0257696 A1* | 11/2006 | Sridhar et al. | 429/13 |
| 2010/0104904 A1* | 4/2010 | Rao et al. | 429/21 |

FOREIGN PATENT DOCUMENTS

| | | |
|---|---|---|
| JP | 2009-59667 A | 3/2009 |
| JP | 2009-070585 | 4/2009 |
| JP | 2009-70585 A | 4/2009 |
| WO | WO 2007/068510 A1 | 6/2007 |
| WO | WO 2009/031459 A1 | 3/2009 |

\* cited by examiner

PROCESS FOR OPERATING A HIGH TEMPERATURE FUEL CELL STACK

The invention concerns a process for operating a high temperature fuel cell (SOC or MCFC) stack. In particular the invention relates to an operation process of a high temperature solid oxide cell stack or molten carbonate fuel cell stack whereby electrical protection of the fuel electrode elements in the stack is obtained.

Fuel cells directly convert chemical energy of a fuel into electricity. Reversible Solid Oxide Cells (SOC) can be used both as Solid Oxide Fuel Cells (SOFC) and as Solid Oxide Electrolyser Cells (SOEC). The fuel electrode in a solid oxide cell is based on a cermet of nickel and yttria stabilized zirconia (Ni/YSZ) and this element is termed the anode in an SOFC and the cathode in an SOEC.

SOECs split water into hydrogen and oxygen and the hydrogen generated can be utilized in the SOFC. SOECs also have the potential of splitting carbon dioxide into carbon monoxide and oxygen. This means that electrolysis of a mixture of steam and carbon dioxide results in a mixture of hydrogen and carbon monoxide (also known as "synthesis gas").

Recent development is directed to improving the performance of SOFCs because these fuel cells are able to convert a wide variety of fuels with a high efficiency.

A single SOFC comprises a solid oxide dense electrolyte sandwiched between an anode (fuel electrode) and a cathode (oxygen electrode), said anode and cathode each having fine pores or channels for supplying the reactants. Upon passing an oxygen-containing gas such as air along the cathode, the oxygen molecules contact the interface between the cathode and electrolyte where they are electrochemically reduced to oxygen ions. These ions diffuse into the electrolyte material and migrate towards the anode where they electrochemically oxidize the fuel at the interface between the anode and the electrolyte. The electrochemical reactions within the fuel cell provide electricity for an external circuit. The fuel cell may further comprise a support having fine pores or channels, which enable the controlled distribution of the fuel. A plurality of SOFCs may be connected in series via interconnects to form a so-called "SOFC stack".

When the SOFC is operated in the reverse mode i.e. as a solid oxide electrolysis cell, SOEC, electricity is directly converted into chemical energy of a fuel. In the SOEC function of the electrodes is reversed compared to the SOFC i.e. the anode of the SOFC functions as the cathode in the SOEC and the cathode of the SOFC functions as the anode. The electrodes for both the SOFC and the SOEC can also be referred to as the fuel electrode and the oxygen electrode as indicated earlier, thus indicating the function of the electrode.

The state-of-the-art SOFC anode is based on a cermet of Ni and yttria stabilised zirconia (Ni/YSZ). The Ni electrode is active only in the reduced state as Ni-particles, not in the oxidised state as NiO. Moreover, re-oxidation of the anode after activation will result in volume expansion of the anode leading to cracks in the electrolyte and a concomitant loss of power.

Oxygen diffuses from surroundings and cathode to the anode chamber e.g. through insufficient seals or through pinholes in electrolyte thereby reacting with fuel. If the fuel flow in the SOFC-system is turned off, the oxygen partial pressure at the anode chamber increases and thereby the risk of re-oxidation of the anode increases.

Conventional technology comprises means to flush the anode chamber with a reducing gas (often diluted $H_2$ in inert gas, natural gas or equivalent) and thereby keeping the oxygen partial pressure below a critical value. The flushing is typically maintained at least at temperatures above approximately 500° C. both during heating and cooling of the system.

U.S. patent application No. 2006/0141300 assigned to Versa Power Systems discloses means to enhance the tolerance of the fuel cell towards re-oxidation.

WO patent application no. 2005/101556 assigned to Versa Power Systems publishes a method to purge the anode chamber with steam thereby removing carbonyl and oxygen species from the Ni-surface.

Another method to prevent oxidation is disclosed by Delphi Technologies in U.S. patent application No. 2003/0235752. An oxygen-getter material e.g. metallic Ni, is placed in the fuel passage ways to prevent oxidation.

JP application no. 2004324060 assigned to Mitsubishi Heavy Industries, ltd. discloses a system consisting of a SOFC in connection with a separate water electrolysis device and a $H_2$-storage tank.

JP patent application no. 7006778 discloses a process whereby a power source is used to generate a flow of oxygen ions from a Ni-YSZ fuel electrode to an air electrode through a YSZ electrolyte to deoxidise NiO of Ni-YSZ and to reduce the ohmic resistance and the polarization resistance of the SOFC.

This process discloses restoration of an SOFC after deterioration by long term operation in order to prolong the lifetime.

Other processes are disclosed in U.S. patent applications Nos. 2000/28362 and 2000/95469.

There is a need for a simple process whereby the Ni fuel electrode is prevented from being oxidised throughout the electrode's lifetime.

The objective of the process of the invention is thus to provide a process whereby the fuel electrode of a solid oxide cell in a stack is protected against oxidation through-out its lifetime.

This objective is obtained by the process of the invention which provides a process for operating a high temperature solid oxide cell stack, the process comprising the following steps:

a) connecting the solid oxide cell stack in parallel to a power supply unit at a predefined temperature and/or voltage of the fuel cell stack, b) applying a voltage from the power supply unit of between 700 to 1500 mV per solid oxide cell across the solid oxide cell stack irrespective of the electromotive force of the solid oxide cell stack, c) heating up the solid oxide cell stack from the predefined temperature to operation temperature while maintaining the voltage per solid oxide cell from the power supply unit, d) maintaining the solid oxide cell stack at or above a predetermined operation temperature and/or above a predetermined voltage until the solid oxide cell stack is to be put into operation, e) supplying fuel to the solid oxide cell stack, f) disconnecting the power supply unit followed by g) connecting a power-requiring load to the fuel cell stack.

The following are embodiments of the invention which can be combined with the embodiments given before or after each embodiment.

Process comprising disconnecting the load, followed by applying a voltage from the power supply unit of between 700 to 1500 mV per solid oxide cell across the solid oxide cell stack irrespective of the electromotive force of the solid oxide cell stack, until the solid oxide cell stack is either put into operation again or the solid oxide cell stack is cooled down to the predefined temperature.

Process comprising putting the solid oxide cell stack into operation again by carrying out steps e), f) and g).

Process comprising disconnecting the fuel supply while applying a voltage from the power supply unit of between 700 to 1500 mV per solid oxide cell across the solid oxide cell stack.

Process comprising disconnecting the load followed by applying a voltage from the power supply unit of between 700 to 1500 mV per solid oxide cell across the solid oxide cell stack irrespective of the electromotive force of the solid oxide cell stack, disconnecting the fuel supply to the solid oxide cell stack and finally cooling down the solid oxide cell stack to the predefined temperature.

Process wherein the voltage from the power supply unit of between 700 to 1500 mV per solid oxide cell includes production tolerance.

Process wherein the voltage from the power supply unit is 1000 mV per solid oxide cell.

Process wherein the predefined temperature is between ambient temperature and 300° C.

Process wherein the solid oxide cell stack is operating in electrolysis mode in steps a) to d) and in SOFC mode in steps e) to g).

Process wherein a gas comprising steam is added at step c) to the fuel electrode.

Process wherein hydrogen produced in the solid oxide cell stack is transferred to a fuel processing system upstream the solid oxide cell stack.

Process wherein the fuel processing system is a reformer or a hydrodesulphurisation unit.

The invention provides a process for protecting the anode of a high temperature SOFC or MCFC in a power generating system against re-oxidation by applying an external voltage to the fuel cell thereby keeping the potential of the fuel cell within a safe zone. The safe zone is defined to be between the Nickel to Nickel oxide oxidation potential and the Carbon monoxide to Carbon reduction potential i.e. between 700 mV-1500 mV at operating temperature.

According to the inventive process, an external potential is applied to the fuel cell stack in the following situations:
- when it is being heated up without reducing gas on the anode i.e. no fuel or protection gas present
- during interrupted duty (so-called trips) of the system where power is not produced
- during hot stand-by situations which may be desired or accidental, where power is not produced
- during shut down of the system where the fuel cell is cooled down without a reducing gas on the anode If the fuel cell stack is at ambient temperature when the power supply unit is connected, then ramping of the voltage from 0 mV up to 700 mV or higher is not critical since the reoxidation rate is low and protection is not required immediately.

If the fuel cell stack is not at ambient temperature when it is to be connected to the power supply unit, then it is important that the power supply unit is, prior to carrying out the connection, already ramped to 700 mV or higher. Thereby the fuel cell stack is protected immediately on connection to the power supply unit.

It is therefore essential that the power supply unit is adjusted to provide a voltage of 700-1500 mV to the fuel cell stack prior to connecting the fuel cell stack.

During normal SOFC operation the electrolyte transports oxygen-ions ($O^{2-}$) from the cathode to the anode where they react with the fuel creating water and free electrons, and thereby a potential difference.

Figure 1:
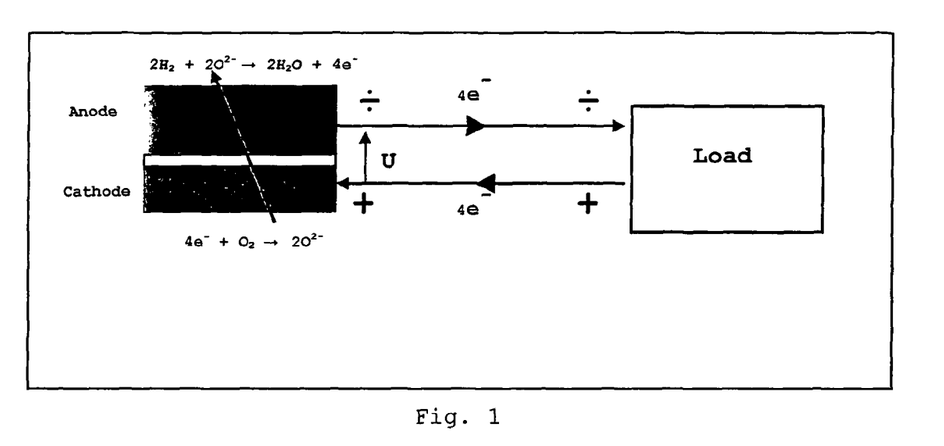
FIG. 1 illustrates transport of oxygen ions and electron flow during conventional SOFC operation.

The SOFC is thus the active unit where the voltage difference ($U_0$) is created and which drives the flow of electrons from the anode (negative electrode) through the external circuit and load (passive unit) to the cathode (positive electrode) which is shown in FIG. 1. The load provides electrical resistance and causes a potential drop. The current runs in the opposite direction of the electrons i.e. from the cathode (+) to the anode (÷).

When carrying out the process of the invention the electrolyte in the SOFC is used to transport oxygen-ions ($O^{2-}$) from the anode chamber to the cathode i.e. opposite of the normal operating mode.

Figure 2:
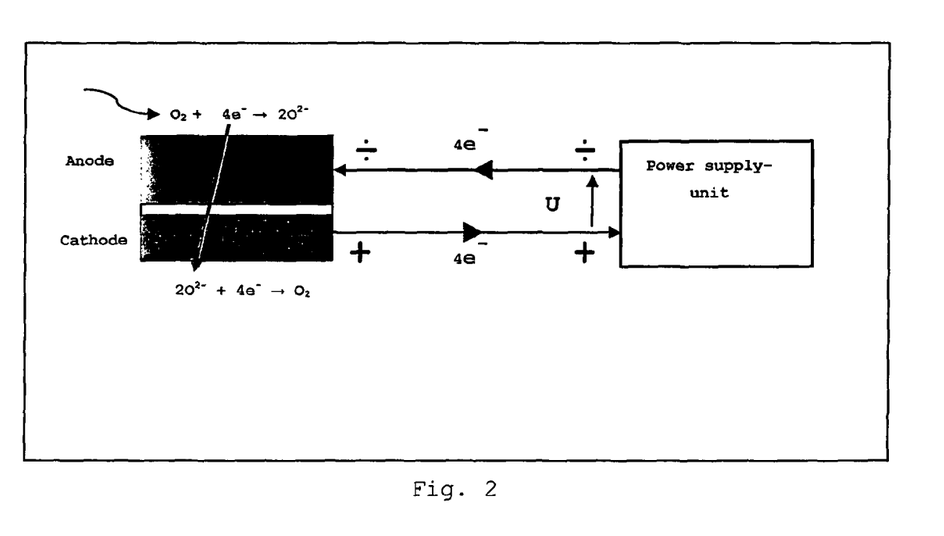
FIG. 2 illustrates electron flow during electrical protection of the anode with the aid of an external power supply unit.

This is done by adding electrons to the anode and thereby ionizing the oxygen. The electrons are delivered by an external circuit where a Power Supply Unit (PSU) is driving the electrons to the anode of the SOFC. The PSU is thus the active unit in the circuit where the potential difference is created and which drives the electrons from (÷) to the anode "through" the stack (by $O^{2-}$ transport) and from the cathode to (+), which is shown in FIG. 2.

The SOFC is the passive unit in the circuit, and though the electrons are running in the opposite direction—the anode is still negative and the cathode is positive and the polarity of the SOFC is the same. This is the case because the current is driven by the PSU and not the SOFC.

To avoid anode re-oxidation the PSU must deliver enough electrons to the anode to keep the individual cell above the reduction potential of Ni to NiO, which is app. 700 mV. The reduction potential for Ni re-oxidation is the lower limit for the cell voltage during operation (700 mV) applied in the process of the invention.

In the process of the invention electrons are supplied from the PSU to boost the cell voltages to a value above 700 mV which is the voltage during safe SOFC operation. The lower safe limit for the individual cell voltages is 700 mV whereby Ni re-oxidation is avoided, and the upper limit for the voltages is approx. 2000 mV corresponding to the risk of decomposing zirconium when the voltage exceeds 2000 mV.

If Carbon Monoxide is present the upper limit for safe operation is the Carbon monoxide to Carbon reduction potential of app 1500 mV.

An essential parameter in the inventive process is then to boost the cell voltage to a value between 700 mV and 1500 mV. The PSU as shown in FIG. 2 with positive (+) to the cathode and negative (÷) to the anode. During start-up a constant protective voltage should be applied, by connecting the PSU, before stack temperature reaches 300° C. It can be applied at room temperature.

Figure 3:
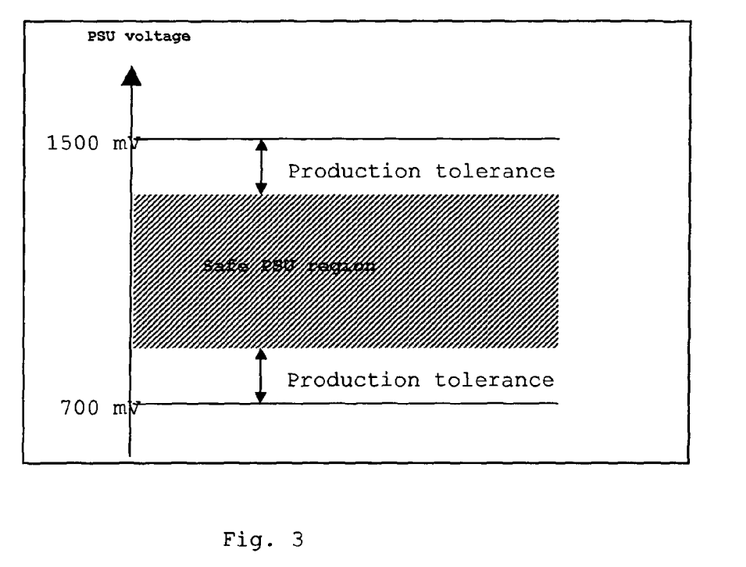
FIG. 3 illustrates the adjustment of cell voltages by subtraction of the production tolerances.

The voltage from the PSU may be approx. 1000 mV pr cell in the stack, but must be adjusted according to specific cell voltage measurements to keep all cell voltages between between 700 and 1500 mV minus production tolerances as shown in FIG. 3.

The current is low at 300° C., but increases as the temperature increases. When the fuel cell stack is at operating temperature, then the operational flows can be applied to the stack, and the PSU turned off.

During unexpected system failure of the SOFC system the PSU can be applied immediately when the SOFC is at open circuit voltage (OCV) and the external load is cut off. This means that no extra control is needed.

During hot standby the PSU can be applied when the SOFC is at OCV. The fuel flow can then be turned off and the stack will be protected against re-oxidation. When the SOFC is to be brought back into service, the fuel is supplied and the PSU turned off.

During Shut-down the PSU is applied when the SOFC is at OCV. The fuel flow is then turned off and the SOFC is cooled to room temperature. The PSU can be turned off when the SOFC is below 300° C. (or at room temperature).

By carrying out the process of the invention the anode of the SOFC is protected, which means that no protection gas (from bottle or produced in the system) is needed. The process provides quick protection in an easy manner, which ensure that the anode is protected at all times.

The PSU can be connected to the trip system which monitors the SOFC system during operation and applied if any failure occurs (no fuel, low SOFC voltage, wrong temperatures or pressures, leaks, safety issues or other system components failure). This means that no extra control is needed when using the process of the invention for protection of the SOFC anode.

The PSU can for instance be a battery, capacitor, AC/DC converter or another fuel cell, and must be able to provide the required voltage in order to maintain sufficient current.

When applying the process of the invention there is no sign of degradation on any of the cells in the stack, indicating that it is possible to prevent damaging re-oxidation of the anode Ni to NiO using electrolysis current protection. The electrolysis current was aimed to be able to match the average leak current of the stack in order to remove all incoming oxygen from the anode. One of the cells (cell 6) had a leak current almost 3 times higher than the average leak current, but there were no signs of degradation of this cell, although it only received about one third of the theoretical needed protection current.

Therefore it does not appear to be crucial to have a uniform distribution of the leak current through the stack to be able to protect the stack using electrolysis current. The test indicates that an electrolysis current of one third of the cells leak current is enough to protect the anode from re-oxidizing.

Start-Up

If the inventive process is carried out with a starting temperature corresponding to room temperature, the anode of the SOFC is protected against re-oxidation during the entire start-up. Fuel can be applied at any time after the operational temperature is reached and the PSU can then be turned off.

The operation temperature is chosen according to the requirements of the fuel cell system design. Conventional operation temperatures of approximately 550 to 850° C. are chosen.

If the inventive process is carried out at room temperature and the power supply unit turned off at operating temperature when fuel is applied, no extra control is needed to handle the PSU, which simplifies the system.

Because no protection gas is needed during start-up, the Fuel Processing System (FPS) which supplies fuel for the SOFC can be kept cold and inactive until the SOFC is at operating conditions. This means more freedom to operate the fuel processing system during start-up.

Trips or Hot Standby

During Trips or hot standby many protection systems monitor the SOFC voltage or the fuel pressure and apply protection if the voltage or pressure drops below a certain critical value. If the pressure or voltage drops below a "critical value" local failures can still occur in one or more individual fuel cells due to re-oxidation.

Figure 4:
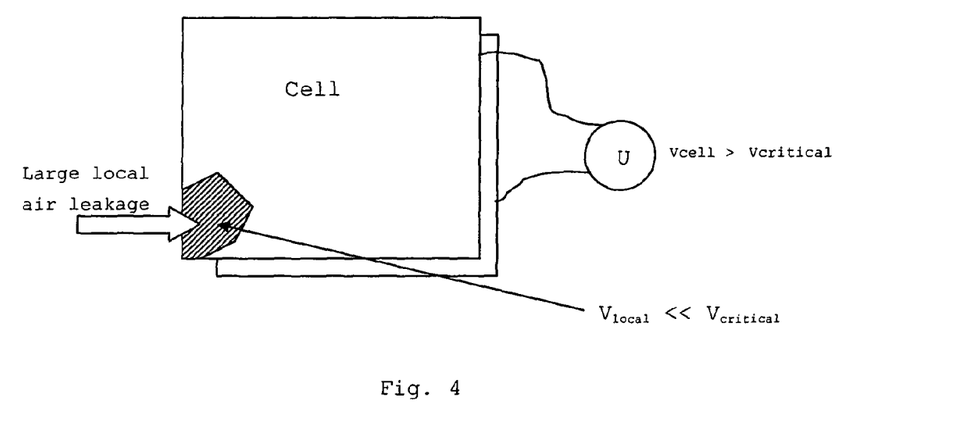
FIG. 4 illustrates local leakage in a cell.
Figure 5:
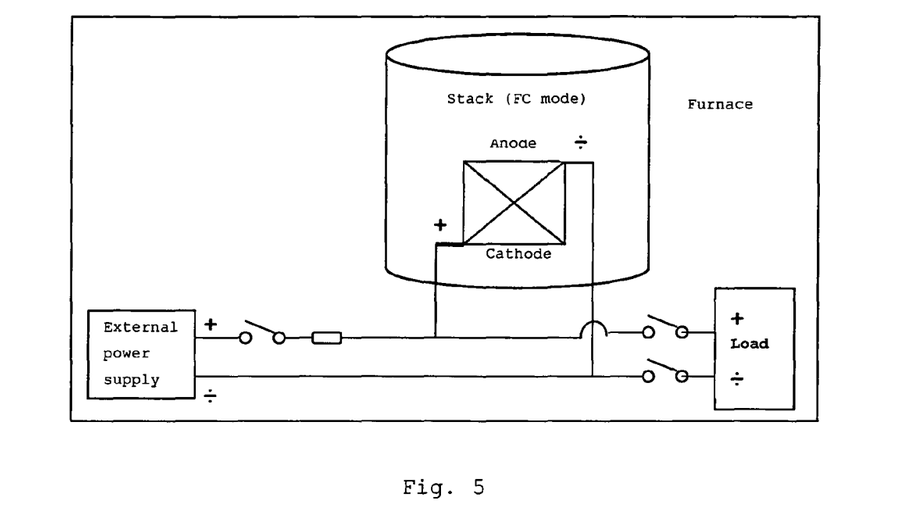
FIG. 5 illustrates the test set-up with an external power supply connected to the set up.

The individual cell voltages can be monitored and even though the cell voltage of a single cell can be above the critical value, a local leakage on the cell will re-oxidise part of the cell, see FIG. 4.

This can be avoided by carrying out the inventive process immediately any failure occurs or if at hot stand-by, irrespective of the electromotive force of the fuel cell stack.

Shut Down

The process of the invention is also carried out when the stack is at open circuit voltage (OCV) and it is desired to shut down the system. The connection to the power supply unit is maintained. Fuel is then cut off and the system is cooled down. The SOFC is thus protected at all times with no risk of any re-oxidation of any part of the cells because no part of the cells or stack is close or below the re-oxidation limit of approximately 700 mV.

The PSU unit is turned off when the SOFC is below 300° C. or at room temperature, as no control is needed and measurement of cell voltages is not necessary.

Figure 10:
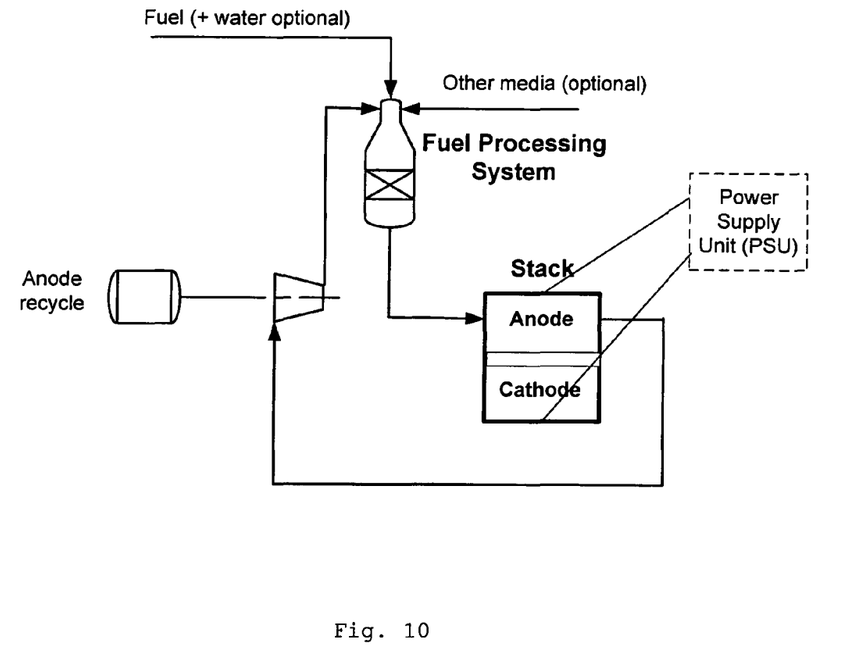
FIG. 10 shows an example of a simple natural gas based system during operation.

In FIG. 10 is shown an example of a simple natural gas based system during operation.

Natural Gas and water is fed to a pre-reformer, where the fuel is pre-reformed to a syngas comprising Hydrogen, Methane, Carbon Monoxide and Water. Any higher hydrocarbons present will also be converted to methane. The syngas is sent to the anode of the SOFC where it is consumed to produce electricity. Air is simultaneously sent to the cathode to participate in the reactions.

During operation, some of the anode-off gas is recirculated to the pre-reformer to reuse the water produced in the SOFC and to recuperate some of the unused hydrogen.

The remaining anode off gas not sent to the pre-reformer, is sent to the off gas-burner where it is combusted using excess cathode air.

During emergency trips, shut-down or hot standby the SOFC anode and the pre-reformer need to be protected against re-oxidation.

Normally the pre-reformer and SOFC are protected by sending an inert protection gas through the anode side of the system.

Both the anode of the SOFC and the pre-reformer are protected by applying the process of the invention. The anode of the SOFC is directly protected against re-oxidation by the electric potential applied by the external Power Supply Unit (PSU).

The pre-reformer (or any other Fuel Processing Unit) is protected against re-oxidation because the SOFC will produce hydrogen from the residual water present in the recycle loop. The residual water from the operation before the trip will immediately be electrolyzed into hydrogen by the solid oxide cell in electrolysis mode and recycled to the FPS.

The electrolysis in the solid oxide cell can be controlled by keeping the voltage of the PSU constant in the "safe region" between 700 and 1500 mV per cell.

If the system needs to be protected during a longer hot standby or trip, water can be supplied through the fuel processing system to the solid oxide cell (as during normal operation of a SOFC) and the electrolysis process in the solid oxide cell will keep producing protection gas comprising hydrogen.

The system of recirculation of hydrogen produced by the SOFC stack can also be used for a Fuel Processing System where hydrogen is needed to process the fuel e.g. a reaction between sulphur and hydrogen to form $H_2S$ which can be absorbed.

Other media apart from fuel and water can be added to the fuel processing system e.g. a mixture of steam and air or the separate addition of steam and air respectively.

EXAMPLES

Experimental Set-Up

A standard stack consisting of 10 SOFC cells was heated to app. 800° C. in a pilot plant using electrolysis current as protection against anode nickel re-oxidation. The stack was subjected to periods with anode protection using electrolysis current at 800° C. up to 63 hours. During the test, the stack was characterized with a standard IV-curve to 25 A. The characterizations showed no sign of degradation of any cell in the standard stack, indicating that it is possible to prevent damaging re-oxidation of the anode Ni to NiO using electrolysis current protection, see FIG. 6 to FIG. 9.

The electrolysis current was aimed to be able to match the average leak current of the stack in order to remove all incoming oxygen to the anode. One of the cells (cell 6) had a leak current almost 3 times higher than the average leak current, but there were no signs of degradation of the cell, although it only received about one third of the theoretical needed protection current. Thus it did not appear crucial to have a uniform distribution of the leak current through the stack to be able to protect the stack using electrolysis current. The test indicated that an electrolysis current of one third of the cells leak current is enough to protect the anode from re-oxidizing, see FIG. 6 to FIG. 9.

Figure 11:
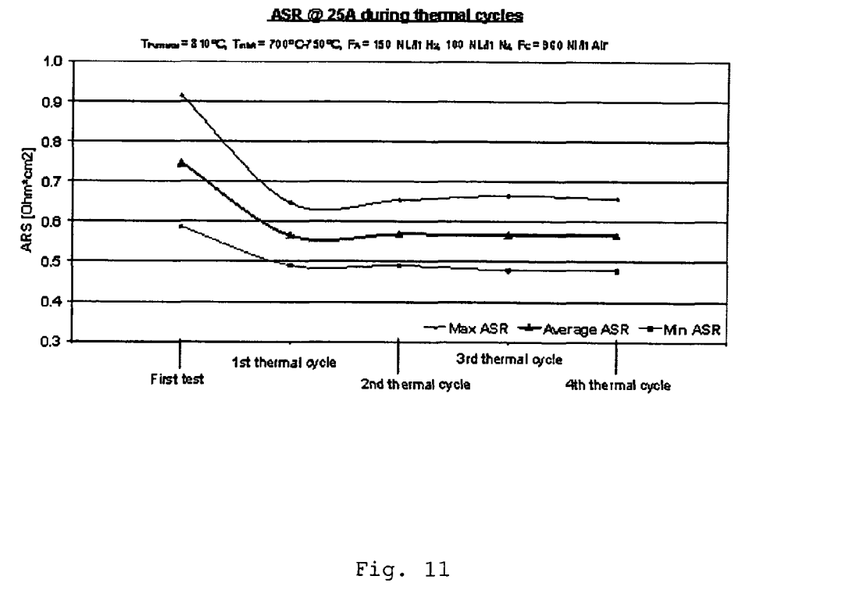
FIG. 11 shows the resistance (ASR) as a function of time.
Figure 12:
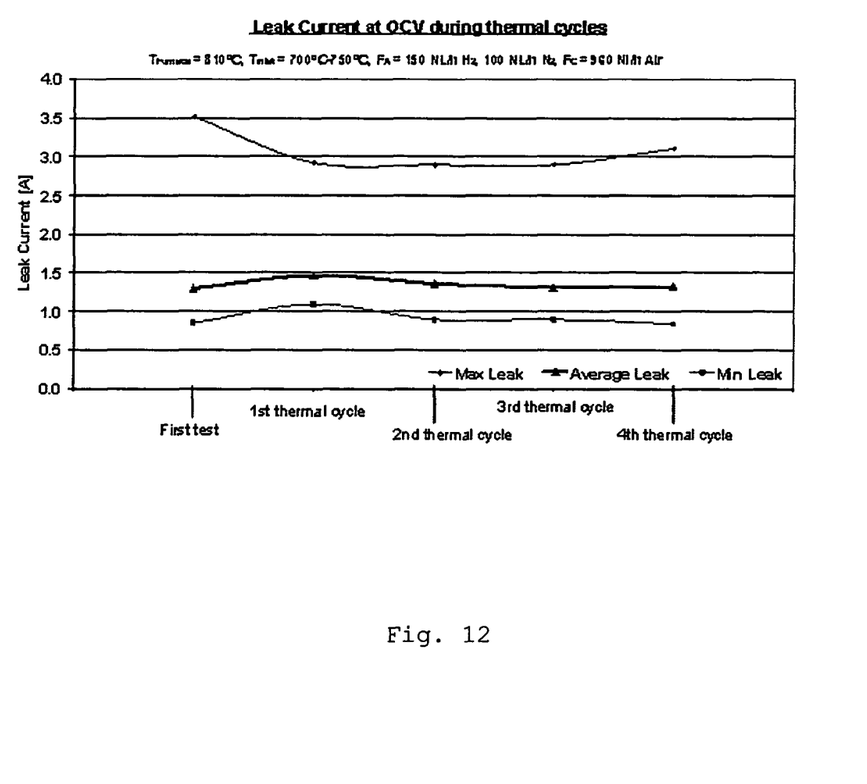
FIG. 12 shows the Leak current (A) as a function of time.

The stack was subjected to 4 thermal cycles where the stack was heated to app. 800° C., characterized and then cooled to app. 400° C. The anode was protected against re-oxidation by electrolysis current during heating up and cooling down. There was no change in ASR or leak current of the stack after 4 thermal cycles with electrolysis current protection of the anode. This indicates that electrolysis current protection is effective during start-up and shut-down, see FIG. 11 and FIG. 12.

Example 1

Comparison of Inventive Process With Process Disclosed in U.S. patent application No. 200028362

In US 200028362 A1 a PSU is applied when the SOFC voltage or the fuel pressure drops below a "critical value". If the unit is applied when the voltage becomes too low, local failures can occur which are not detected and the power supply is applied too late".

Below are two examples of failures of the control in US 0028362:

The SOFC stack voltage in a 10 cell stack is used to control the PSU, and the critical voltage is set to 700 mV pr cell which equals 7 V for the SOFC stack.

The individual voltages of the cells will vary depending on cell quality, local leaks etc. This means that a measured stack voltage of 7.7 V (which is above the critical limit) could be achieved by 9 cells with 800 mV and one cell with 500 mV ((9×0.8)+0.5=7.7).

This means that the one cell with a voltage of 500 mV needs protection against re-oxidation, but no PSU will be applied until the entire stack voltage is below 7 V.

The same applies when the control of the anode oxidation in US 200028362 is the monitoring of individual cell voltages. The cell voltage can be above "the critical value" while a local leakage on the cell will re-oxidise part of the cell, as shown in FIG. 3.

Example 2

First Thermal Cycle With Applied Electrolysis Current

Figure 7:
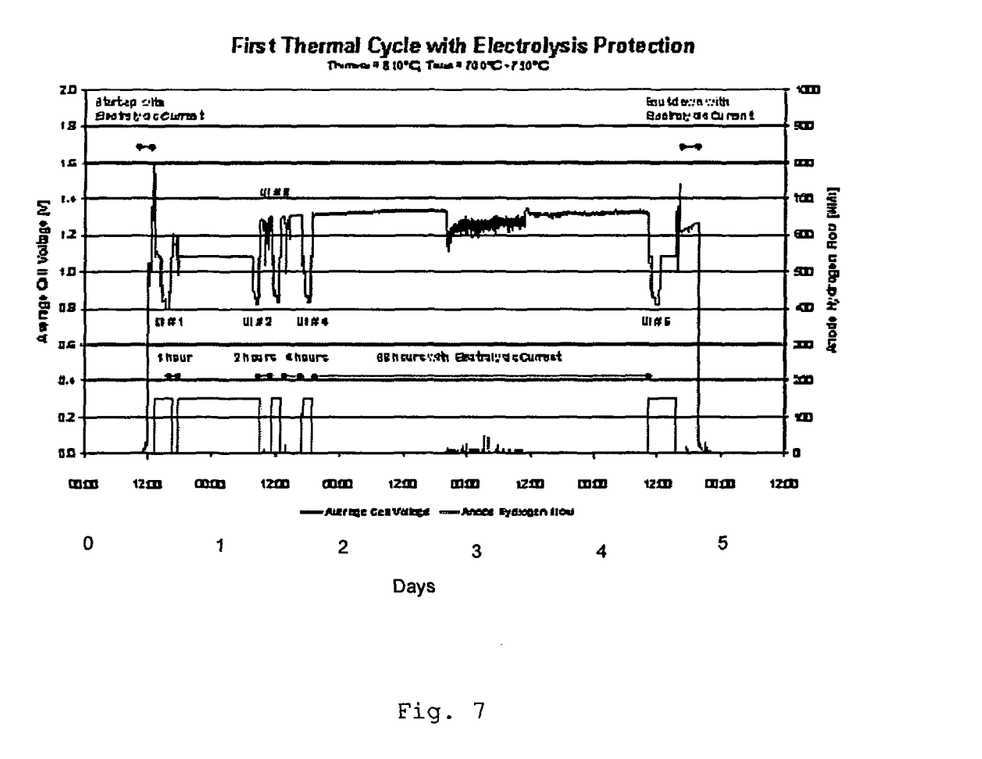
FIG. 7 illustrates stack voltage, fuel flow and electrolysis current as a function of time.

The stack was heated up without protection gas, but with applied PSU current, then subjected to 4 periods of anode protection using PSU current at operational temperature before shut-down with PSU current as shown in FIG. 7.

The stack was characterized between every period with applied PSU current with a standard IV-curve to 25 A. These characterizations where made to compare performance of the stack with the test performed on the standard stack in pilot P5-046 and during the test with the process of the invention in pilot P1-084. The characterization-curves for the tests in pilots P5-046 and P1-084 nos. 1-5 are shown in FIG. 6.

Figure 6:
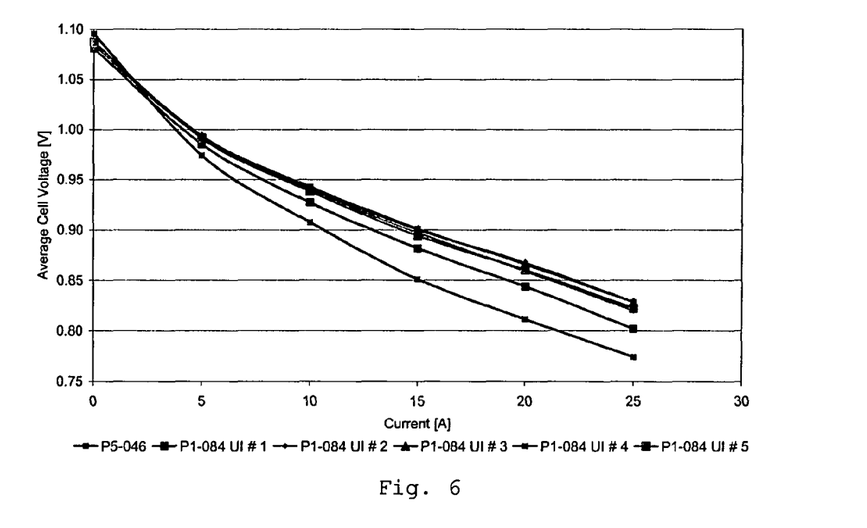
FIG. 6 illustrates characterization curves from the first thermal cycle.

As can be seen in FIG. 6, the stack performance improves from P5-046 to P1-084 UI#1 and again to P1-084 UI#2 which are the two characterizations after start-up with electrolysis current and a period of 1 hour at operational temperature with applied protection current.

The performance of the stack is then the same for UI nos. 2 to 5, showing that the anode protection with PSU current is effective during start-up and at operational temperature (800° C.) for a period up to approx. 63 hours.

Figure 8:
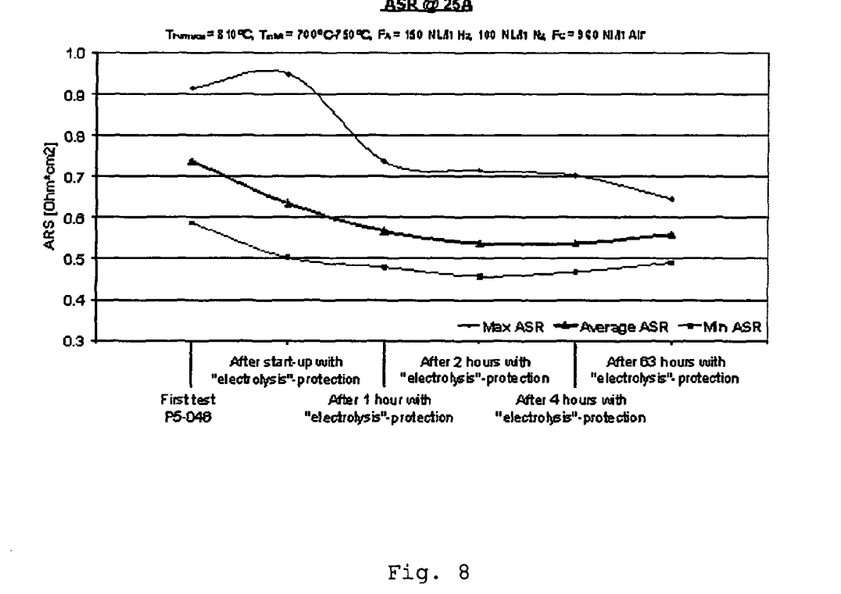
FIG. 8 illustrates the resistance (ASR) as a function of time.

FIG. 8 shows the calculated minimum, maximum and average ASR at 25 A, standard conditions for the standard stack during the first thermal cycle with periods of anode protection using PSU current. It can be seen that the ASR is reduced from the initial test, and that the ASR is not significantly changed after periods with PSU current to protect the anode from re-oxidation.

Figure 9:
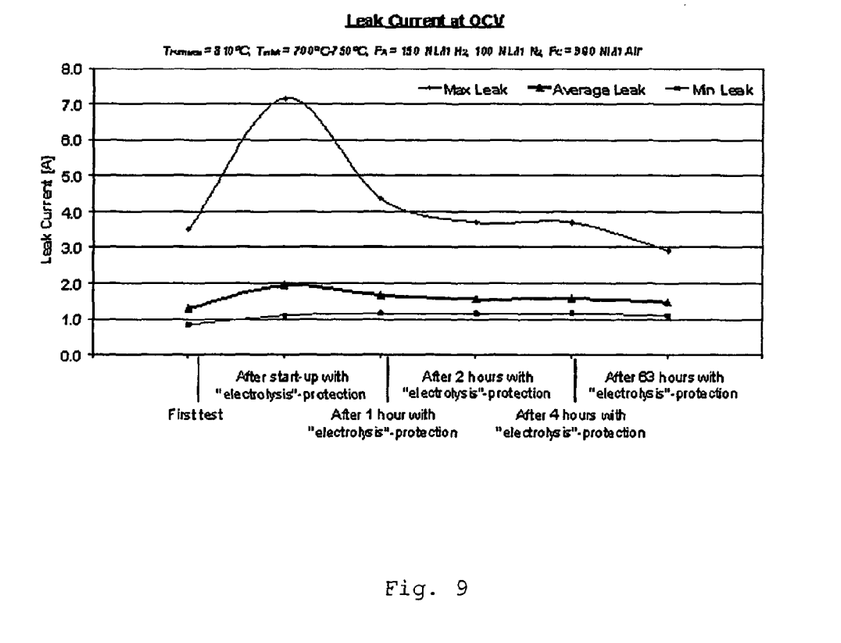
FIG. 9 illustrates the leak current (A) as a function of time.

FIG. 9 shows the calculated leak current for the stack from the initial test in pilot P5-046 and during first thermal cycle in pilot P1-084. It can be seen that the average leak is almost constant during the test, indicating that no extra leakage caused by cracking of the anode has a cured.

The invention claimed is:

1. Process for operating a high temperature fuel cell stack while preventing oxidation of the anodes, the process comprising the following steps:
   a) connecting the fuel cell stack in parallel to a power supply unit at a predefined temperature and/or voltage of the fuel cell stack,
   b) applying a voltage from the power supply unit of between 700 to 1500 mV per fuel cell across the fuel cell stack irrespective of the electromotive force of the fuel cell stack, c) heating up the fuel cell stack from the predefined temperature to operation temperature while maintaining the voltage per fuel cell from the power supply unit,
d) maintaining the fuel cell stack at or above a predetermined operation temperature and/or above a predetermined voltage until the fuel cell stack is to be put into operation,
e) supplying fuel to the fuel cell stack,
f) disconnecting the power supply unit followed by
g) connecting a power-requiring load to the fuel cell stack.

2. Process according to claim 1, comprising disconnecting the load, followed by applying a voltage from the power supply unit of between 700 to 1500 mV per fuel cell across the fuel cell stack irrespective of the electromotive force of the fuel cell stack, until the fuel cell stack is either put into operation again or the fuel cell stack is cooled down to the predefined temperature.

3. Process according to claim 2, comprising putting the fuel cell stack into operation again by carrying out steps e), f) and g).

4. Process for shut-down of a high temperature fuel cell stack while preventing oxidation of the anodes, the process comprising the steps of:
a) connecting the fuel cell stack in parallel to a power supply unit at a pre-defined temperature and/or voltage of the fuel cell stack,
b) applying a voltage from the power supply unit of between 700 to 1500 mV per fuel cell across the fuel cell stack irrespective of the electromotive force of the fuel cell stack,
c) establishing the fuel cell stack at open circuit voltage (OCV) while maintaining the voltage per fuel cell from the power supply unit,
d) disconnecting the fuel supply from the fuel cell stack, and
e) cooling down the fuel cell stack.

5. Process for operating a high temperature fuel cell stack during trips while preventing oxidation of the anodes, the process comprising the steps of:
a) connecting the fuel cell stack in parallel to a power supply unit at a predefined temperature and/or voltage of the fuel cell stack,
b) applying a voltage from the power supply unit of between 700 to 1500 mV per fuel cell across the fuel cell stack irrespective of the electromotive force of the fuel cell stack, and
c) disconnecting the load on said fuel cell stack while maintaining the voltage per fuel cell from the power supply unit during said trip, irrespective of the electromotive force of the fuel cell stack.

6. Process for operating a high temperature fuel cell stack during hot stand-by while preventing oxidation of the anodes, the process comprising the steps of:
a) connecting the fuel cell stack in parallel to a power supply unit at a predefined temperature and/or voltage of the fuel cell stack,
b) applying a voltage from the power supply unit of between 700 to 1500 mV per fuel cell across the fuel cell stack irrespective of the electromotive force of the fuel cell stack, and
c) turning off the fuel flow to the fuel cell stack,
d) disconnecting the load on said fuel cell stack while maintaining the voltage per fuel cell from the power supply unit during said hot stand-by, irrespective of the electromotive force of the fuel cell stack, and
e) when the fuel cell stack is to be brought back into service, the fuel is supplied and the power supply unit is turned off.

7. Process according to claim 6, wherein the voltage from the power supply unit is 1000 mV per fuel cell and includes production tolerance.

8. Process according to claim 4, wherein the power supply is turned off when the fuel cell stack is between ambient temperature and 300° C.

9. Process according to claim 1, wherein the fuel cell stack is operating in electrolysis mode in steps a) to d) and in fuel cell mode in steps e) to g).

10. Process according to claim 1, wherein a gas comprising steam is added at step c) to the fuel electrode.

11. Process according to claim 2, wherein hydrogen produced in the fuel cell stack is transferred to a fuel processing system upstream the fuel cell stack.

12. Process according to claim 11, wherein the fuel processing system is a reformer or a hydrodesulphurization unit.

13. Process according to claim 1, wherein the high temperature fuel cell is a molten carbonate fuel cell or a solid oxide cell.

14. Process according to claim 13, wherein the solid oxide cell is a solid oxide fuel cell or a solid oxide electrolysis cell.

15. Process according to claim 1, wherein the voltage from the power supply unit of between 700 to 1500 mV per fuel cell includes production tolerance.

* * * * *